United States Patent
Kuo

(10) Patent No.: US 6,619,084 B2
(45) Date of Patent: Sep. 16, 2003

(54) LOCK ASSEMBLY FOR A CYCLE

(76) Inventor: Lambert Kuo, No. 16, Lane 459, Sec. 1, An Ho Rd., Tainan (TW)

( * ) Notice: Subject to any disclaimer, the term of this patent is extended or adjusted under 35 U.S.C. 154(b) by 0 days.

(21) Appl. No.: 09/928,015

(22) Filed: Aug. 8, 2001

(65) Prior Publication Data

US 2003/0029209 A1 Feb. 13, 2003

(51) Int. Cl.[7] .............................................. E05B 71/00
(52) U.S. Cl. ................................ 70/233; 70/51; 70/52; 70/58; 224/425; 224/462; 248/553
(58) Field of Search .............................. 70/233, 18, 30, 70/49, 58, 51, 52; 224/425, 427, 454, 462; 248/551, 553

(56) References Cited

U.S. PATENT DOCUMENTS

| | | | | |
|---|---|---|---|---|
| 3,824,540 A | * | 7/1974 | Smith, II ................... | 70/233 X |
| 4,736,921 A | * | 4/1988 | Zane et al. ................ | 248/316.2 |
| 5,291,765 A | * | 3/1994 | Hoisington ................. | 70/233 |
| 5,405,113 A | * | 4/1995 | Jaw .......................... | 70/233 X |
| 5,408,212 A | * | 4/1995 | Meyers et al. ............. | 70/233 X |
| 5,647,520 A | * | 7/1997 | McDaid ..................... | 224/425 |
| 5,653,365 A | * | 8/1997 | Lee .......................... | 224/448 |
| 5,718,134 A | * | 2/1998 | Chang ...................... | 70/233 |
| 5,761,934 A | * | 6/1998 | Kuo ........................ | 70/49 |
| 6,016,673 A | * | 1/2000 | McDaid ..................... | 70/18 |
| 6,321,961 B1 | * | 11/2001 | McDaid et al. ............. | 224/442 |

FOREIGN PATENT DOCUMENTS

| | | | | |
|---|---|---|---|---|
| DE | 3325123 | * | 3/1984 | ............ 70/233 |
| DE | 3913471 | * | 3/1990 | ............ 70/233 |
| EP | 49904 | * | 4/1982 | ............ 70/233 |
| EP | 440052 | * | 8/1991 | ............ 70/233 |
| EP | 476260 | * | 3/1992 | ............ 70/233 |

* cited by examiner

Primary Examiner—Lloyd A. Gall
(74) Attorney, Agent, or Firm—Hedman & Costigan, P.C.

(57) ABSTRACT

A lock assembly for a cycle includes a lock having a main body integrally formed with an insert, and an appendage having a holder and a latch. The holder is adapted to be fastened to the cycle and has a side slot for snugly receiving the insert of the lock. The latch is movable relative to the holder and is spring-loaded so as to retain the insert in the side slot. Therefore, the lock can be held and carried on the cycle after the insert has been pushed into and retained in the slot, and can be removed from the cycle after the insert has been released from the latch.

1 Claim, 5 Drawing Sheets

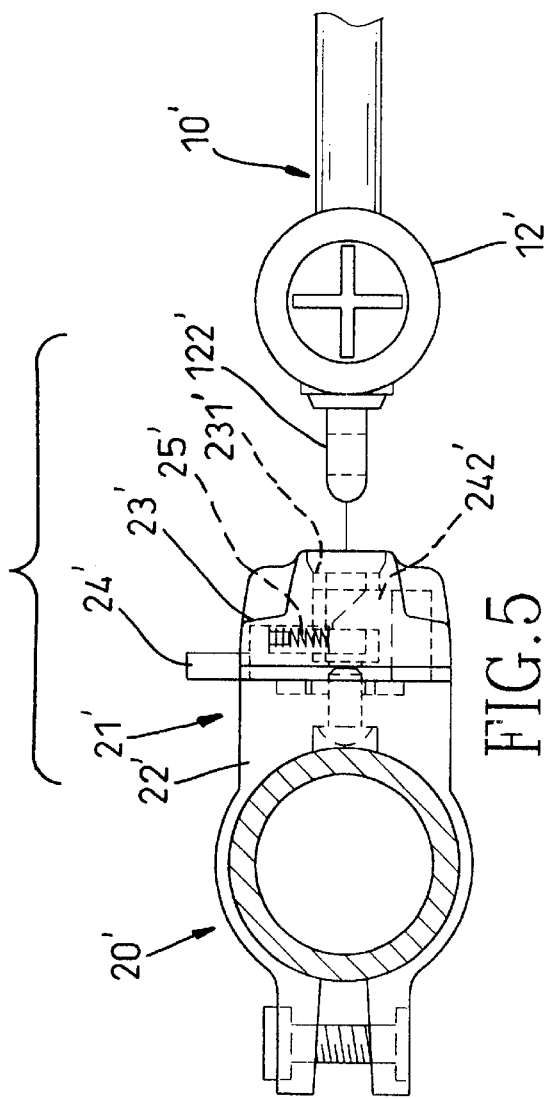
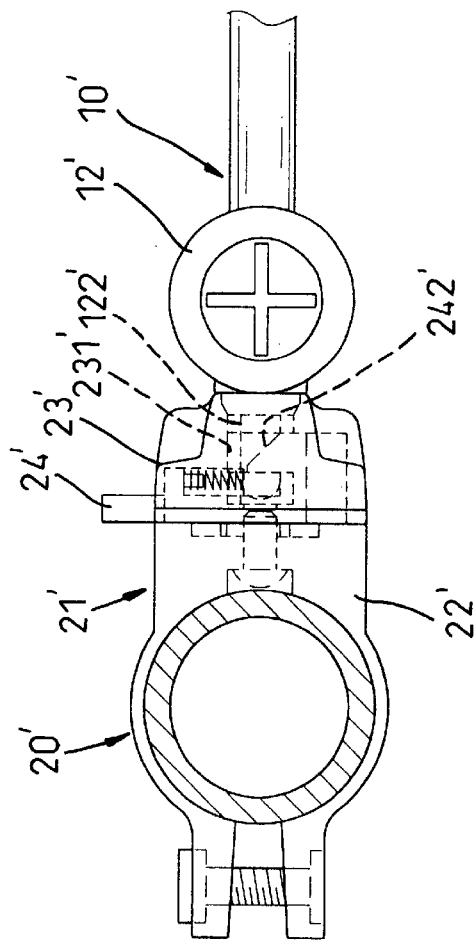

LOCK ASSEMBLY FOR A CYCLE

BACKGROUND OF THE INVENTION

1. Field of the Invention

The present invention relates to a lock assembly for a cycle and, more particularly, to such a lock assembly with a simple structure.

2. Description of Related Art

There are various types of locks used for cycles, i.e. bicycles and motorcycles. Some of the locks, such as those with U-shaped shackles or with wire cables, can be put on and removed from the cycles, for the purpose of locking their wheels and thus immobilizing the cycle. Such a lock is usually carried on the cycles by means of a holder, which is positioned on a tube of the cycle, especially the seat tube/post.

A lock assembly for this purpose is known. The lock assembly includes a lock having a U-shaped shackle and a main body, with a separate insert attached to the shackle in a location near the main body. The assembly further includes a holder having a sleeve securely mounted around a tube of the cycle, and the sleeve is formed with a slotted member that has a crossed T-slot for snugly receiving the insert of the lock. Furthermore, the slotted member is provided with a spring-loaded latch to retain the insert in the T-slot.

In this configuration, the lock can be held and carried on the cycle by pushing the insert into the T-slot, by which the insert will be retained securely by the latch. However, a problem arises that the lock assembly has a less simple structure than possible, since the insert is made separately from instead of integrally with the lock.

Therefore, it is an objective of the invention to provide a lock assembly to mitigate and/or obviate the aforementioned problem.

SUMMARY OF THE INVENTION

The object of the present invention is to provide a lock assembly with a simple structure.

Other objects, advantages and novel features of the invention will become more apparent from the following detailed description when taken in conjunction with the accompanying drawings.

BRIEF DESCRIPTION OF THE DRAWINGS

FIG. 5 is a top view of the lock assembly of FIG. 4, showing a lock included in the assembly to be engaged with a holder;

FIG. 6 is a top view similar to FIG. 5, but showing the lock engaged with the holder.

DETAILED DESCRIPTION OF THE PREFERRED EMBODIMENT

The figures show some embodiments of a lock assembly in accordance with the present invention for a cycle.

Figure 1:
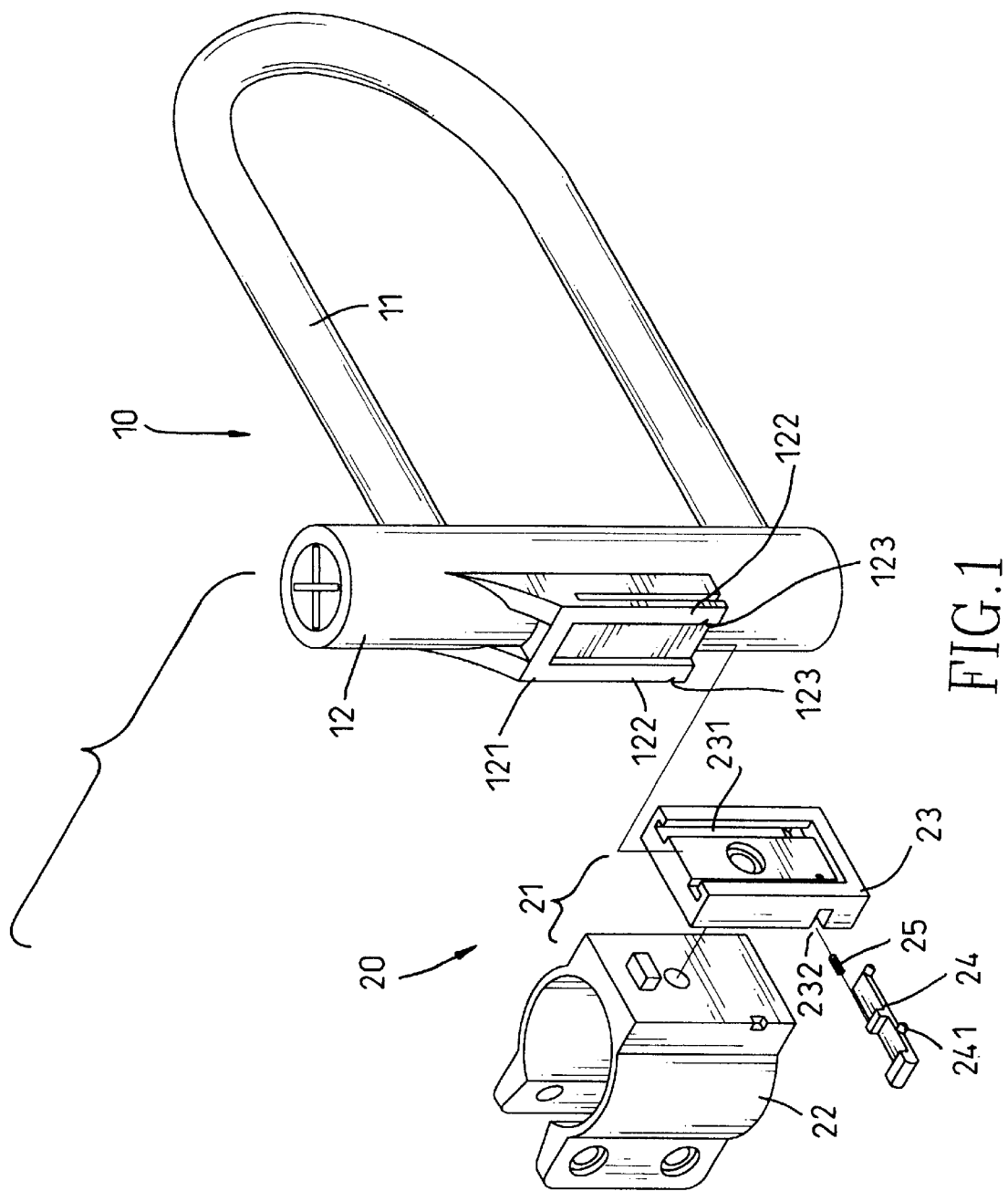
FIG. 1 is an exploded perspective view of a first embodiment of a lock assembly in accordance with the present invention for a cycle.

Referring to FIG. 1, the first embodiment of the lock assembly includes a lock (10) having a shackle (11) and a main body (12) which, according to the present invention, is integrally formed with an insert (121).

Figure 2:
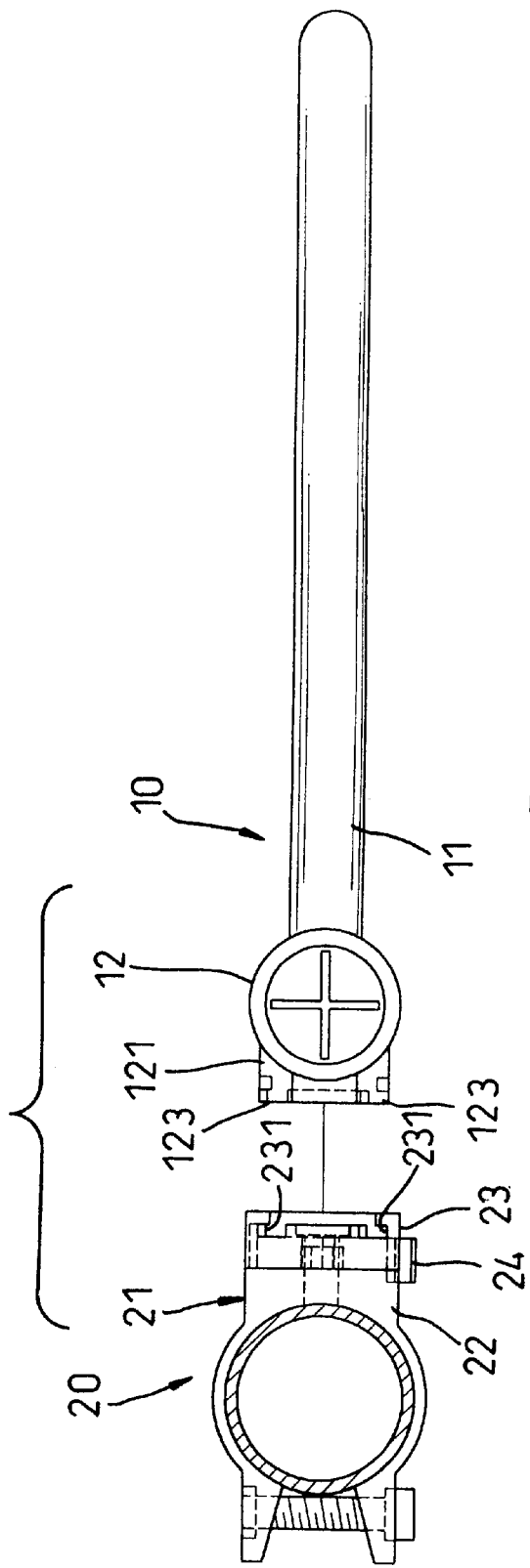
FIG. 2 is a top view of the lock assembly of FIG. 1, showing a lock included in the assembly to be engaged with a holder.

An appendage (20) is provided for holding the lock (10) on the cycle in a quick-detachable manner. The appendage (20) includes a holder (21) having a sleeve (22) adapted to be securely mounted around one of tubes of the cycle, which, as apparent to those skilled in the art, can be achieved in many ways. For example, the sleeve (22) can be made in a C-shaped configuration having a pair of lips extending therefrom, with pairs of aligned holes defined in the lips. The sleeve (22) in this configuration can be fixed to the tube, by means of screws that extend through the holes and threadedly engage with nuts, as best shown in FIG. 2.

Irrespective of its configuration, the sleeve (22) is formed with a slotted member (23), which may be formed integrally with the sleeve (22), or alternatively, may be made separately from and then attached to the sleeve (22). The slotted member (23) defines therein a side slot (231) for snugly receiving the insert (121) of the lock (10).

In the first embodiment, the side slot (231) of slotted member (23) is configured as a U-slot with an open top, while the insert (121) of the lock (10) has a pair of wings (122) shaped to mate with the U-slot of the slotted member (23).

Furthermore, the insert (121) has a pair of notches (123) defined in place therein, and the slotted member (23) further defines a channel (232), in communication with the side slot (231), for receiving a latch (24).

The latch (24) is movable in the channel (232) relative to the holder (21), and has a pair of stubs (241) movable into the notches (123) of the insert (121). Preferably, the latch (24) is spring-loaded, such as by a helical spring (25), in such a way that the stubs (241) tend to move into the notch (123) and retain the insert (121) in the side slot (231) of the slotted member (23), thereby retaining the insert (121) in the side slot (231) after the stub (241) has been moved into the notch (123) and allowing the insert (121) to be removed from the slot (231) after the stub (241) has been moved away from the notch (123), such as by depressing the latch (24).

Figure 3:
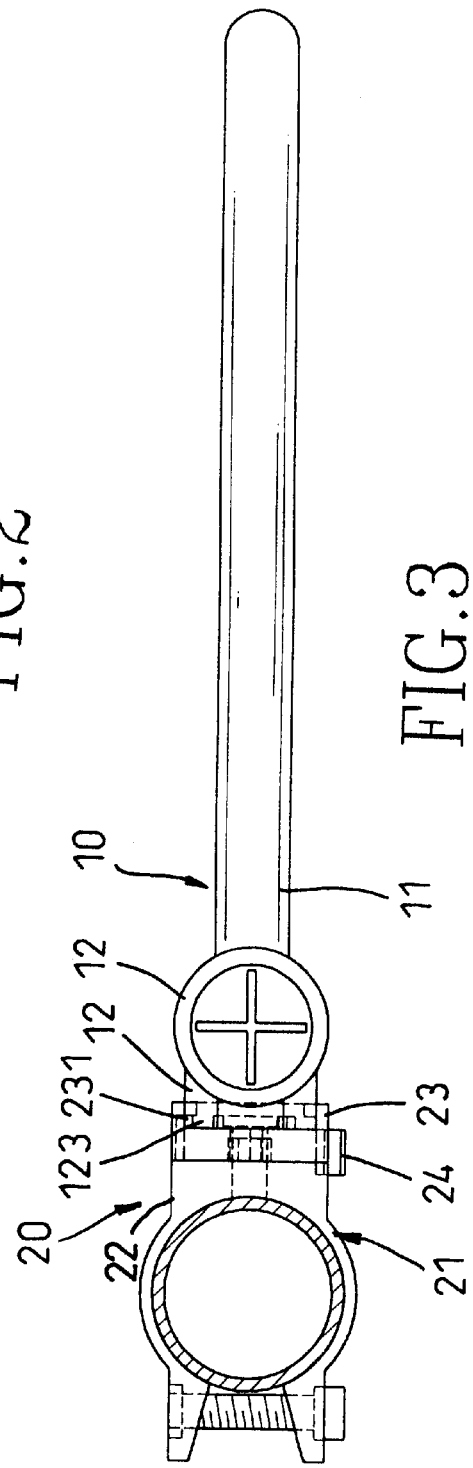
FIG. 3 is a top view similar to FIG. 2, but showing the lock engaged with the holder.

Referring to FIGS. 2 and 3, the holder (21) can be fastened to the cycle by mounting the sleeve (22) in place around one of tubes of the cycle before the screws are tightly engaged with the nuts, as mentioned above briefly. The slotted member (23), together with the latch (24) and the helical spring (25), may be attached to the sleeve (22) either before or after the mounting of the sleeve (22) around the tube.

Once assembled, the lock (10) can be held and carried on the cycle, by way of pushing the insert (121) of the main body (12) downward into the side slot (231) from the open top, until the stubs (241) of the latch (24) is moved, under the action of the spring (25), into the notches (123) of the insert (121). The insert (121) is then securely retained in the side slot (231) and the lock (10) is securely held on the cycle.

The lock (10) can be removed from the cycle simply by depressing the latch (24). At this time, the stubs (241) of the latch (24) are moved, against the action of the spring (25), away from the notches (123) of the insert (121). As a result, the insert (121) is released from the latch (24) and can be removed from the side slot (231) by lifting the lock (10).

Figure 4:
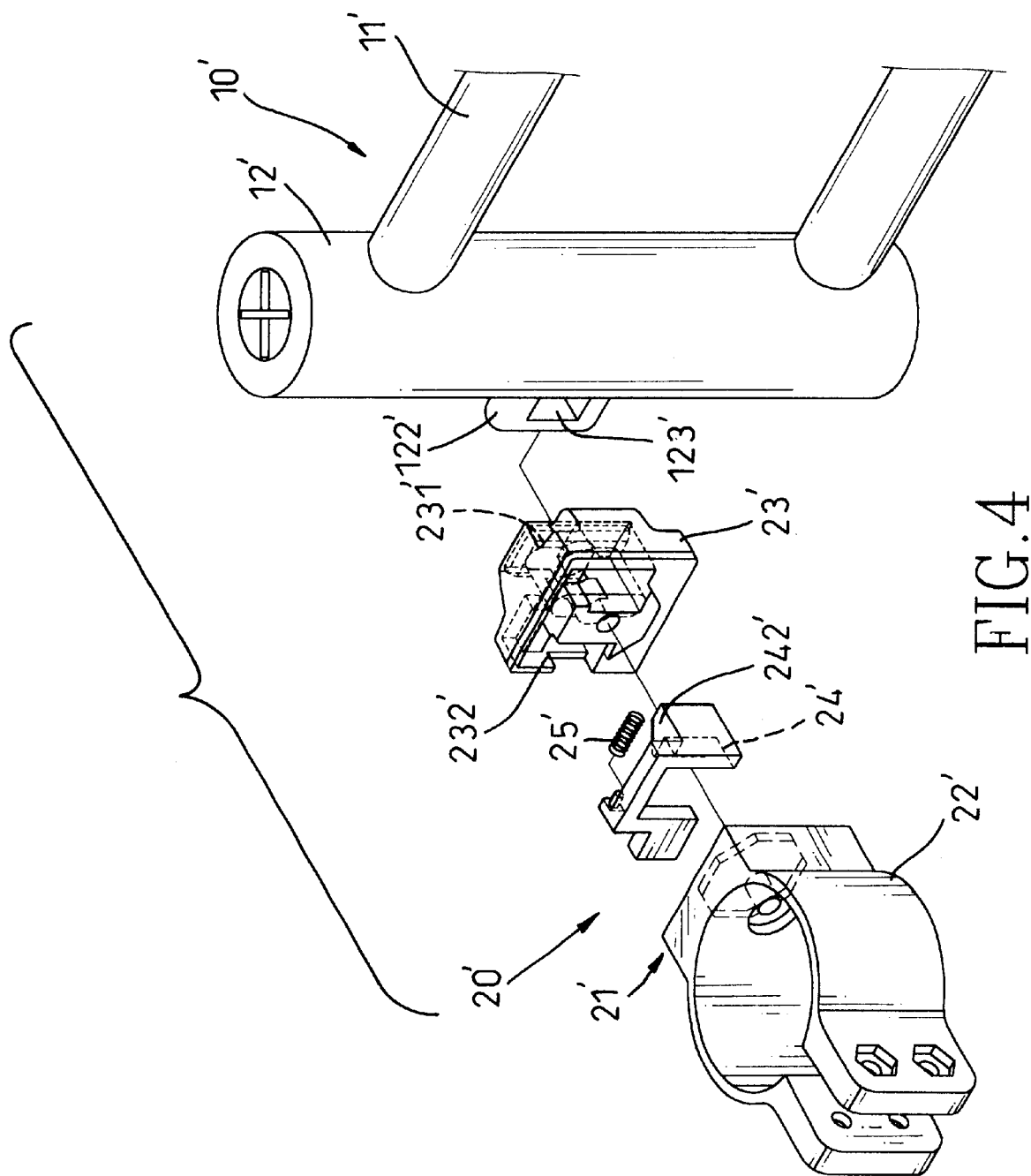
FIG. 4 is an exploded perspective view of a second embodiment of the lock assembly in accordance with the present invention.

Referring to FIG. 4, the second embodiment of the lock assembly also includes a lock (10') and an appendage (20'), with the lock (10') including a shackle (11') and a main body (12'), and with the appendage (20') including a holder (21') having a sleeve (22') formed with a slotted member (23').

In this embodiment, however, the slotted member (23') defines a side slot (231') which is configured as a horizontal slot extending to the interior of the member (23'), and the main body (12') of the lock (10') is integrally formed with an insert (122') which is shaped to mate with the horizontal slot of the slotted member (23') and which has an opening (123') defined in place therein.

The slotted member (23') further defines a channel or chamber (232') in communication with the horizontal side slot (231') for receiving a latch (24'). The latch (24') is movable in the channel or chamber (232') relative to the holder (21'), but has a hook (242') formed in the latch (24') to be slidable into the opening (123') of the insert (122').

Preferably, the latch (24') is spring-loaded, e.g. by a helical spring (25'), in such a way that the hook (242') tends to slide into the opening (123') and retain the insert (122') in the side slot (231') of the slotted member (23'), thereby retaining the insert (122') in the side slot (231') after the hook (242') has slid into the opening (123') and allowing the insert (122') to be removed from the slot (231') after the hook (242') has been disengaged from the opening (123'), such as by depressing the latch (24').

Referring to FIGS. 5 and 6, the lock (10') can be held and carried on the cycle by pushing the insert (122') of the main body (12') horizontally into the side slot (231'). Once the hook (242') of the latch (24') slides into the opening (123') of the insert (122') under the action of the spring (25'), the insert (122') is securely retained in the side slot (231') and the lock (10') is securely held on the cycle.

The lock (10') can be removed from the cycle simply by depressing the latch (24'). This causes the hook (242') of the latch (24') to be disengaged from the opening (123') of the insert (122'). The insert (122') is then released from the latch (24') and can be removed from the side slot (231') by pulling the lock (10').

Figure 7:
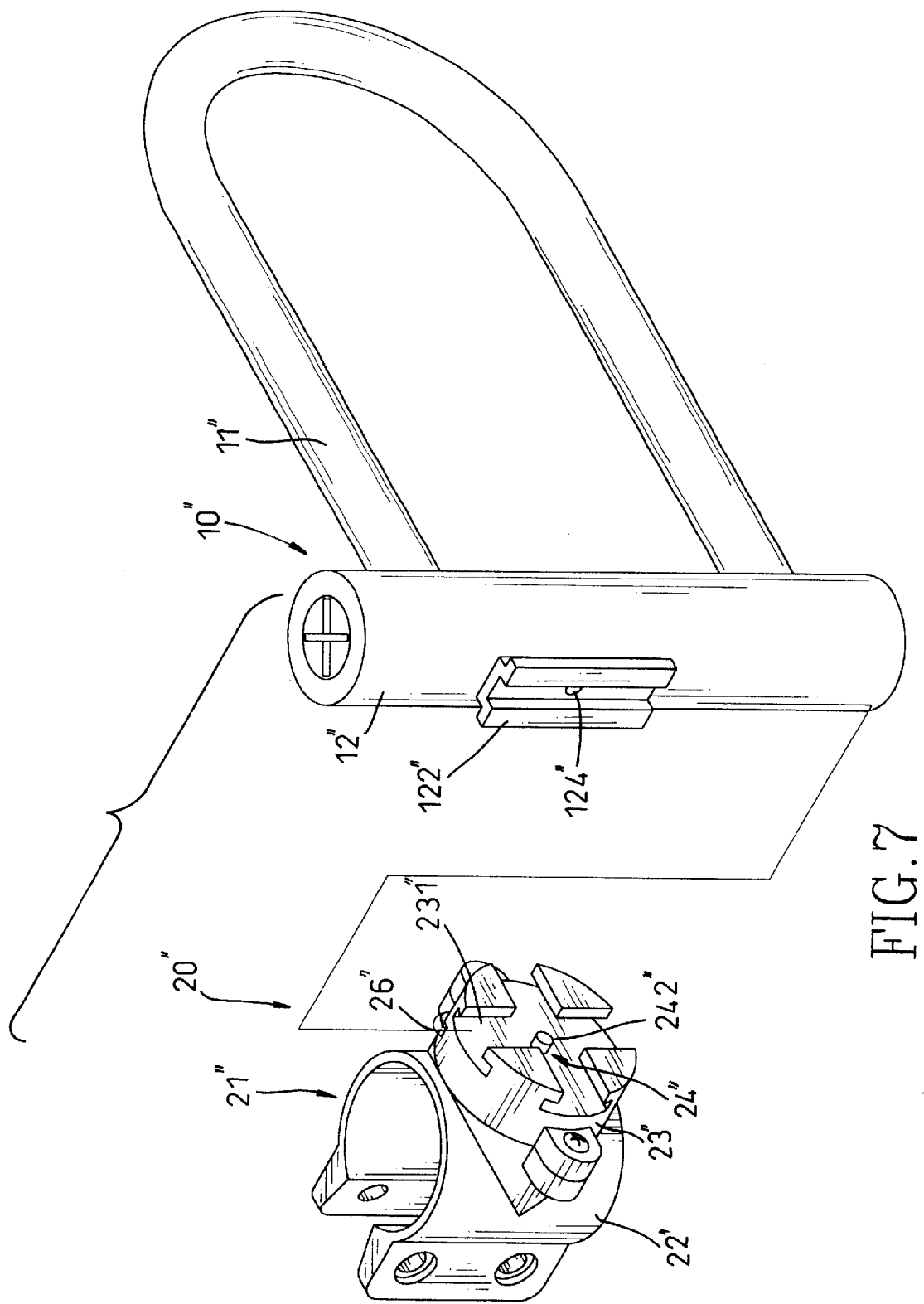
FIG. 7 is an exploded perspective view of a third embodiment of the lock assembly in accordance with the present invention.

Referring to FIG. 7, the third embodiment of the lock assembly includes a lock (10") having a shackle (11") and a main body (12"), and an appendage (20") having a holder (21") in the configuration of a sleeve (22") formed with a slotted member (23").

The slotted member (23") here defines a side slot (231") configured as a crossed T-slot, including a vertical portion and a horizontal portion. The main body (12") is integrally formed with an insert (122") shaped to mate with either portion of the crossed side slot (231"), with a bore (124") defined in place in the insert (122").

Located in a center of the crossed T-slot (231") is a spring-loaded latch (24") that is configured as a post (242") movable into the bore (124"), thereby retaining the insert (122") in one portion of the crossed side slot (231") after the post (242") has been moved into the bore (124") and allowing the insert (122") to be removed from the slot (231") after the post (242") has been moved away from the bore (124"), such as by operating a handle (26").

Since this embodiment of the lock assembly is operated in a manner substantially similar to the first one, no detail about the operation will be given.

From the above description, it is noted that the invention has the advantages of simple structure, since the insert (121, 122', 122") is integrally formed on the main body (12, 12', 12") of the lock (10, 10' 10").

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lock assembly for a cycle comprising:

a lock having a shackle and a main body detachably connected to the shackle and integrally formed with an insert;

an appendage having a holder and a latch, said holder being adapted to be fastened to said cycle and having a side slot for snugly receiving said insert of said lock, said latch being movable relative to said holder and being spring-loaded so as to retain said insert in said side slot, wherein said holder includes a sleeve adapted to be securely mounted around a tube of said cycle, and wherein said sleeve is formed with a slotted member defining said side slot, wherein said slotted member has a channel defined therein, and wherein said latch is movable in said channel, wherein said side slot of said slotted member is configured as a U-slot with an open top, and wherein said insert of said lock as a pair of wings shaped to mate with said U-slot of said slotted member, wherein said insert has at least one notch in place in each of said wings, and wherein said latch has at least one stub formed on the latch to be movable into said notch, thereby retaining said insert in said side slot after said stub is moved into said notch and allowing said insert to be removed from said slot after said stub is moved away from said notch, whereby said lock may be held and carried on said cycle after said insert has been pushed into and retained in said slot, and may be removed from said cycle after said insert has been released from said latch.

* * * * *